6191X
King & Blasdel.
Card Clothing.
Patented Oct. 14, 1830.
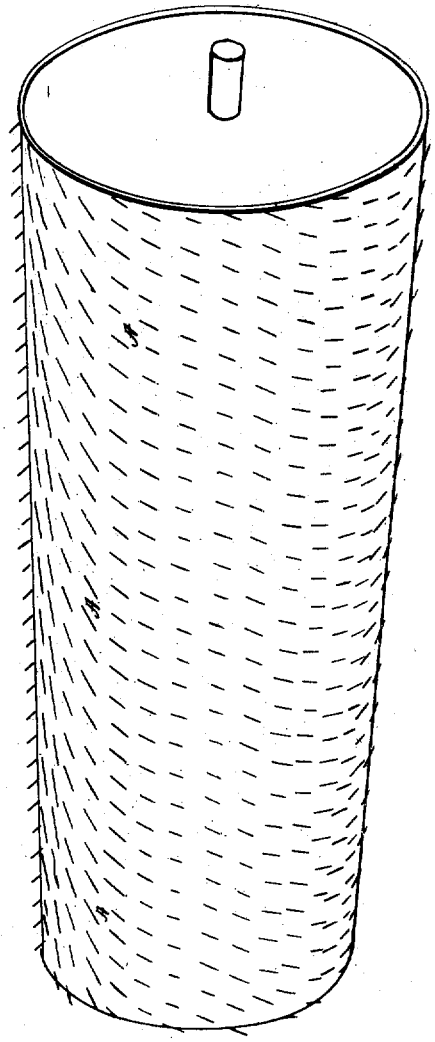
N. PETERS, PHOTO-LITHOGRAPHER, WASHINGTON, D. C.

Phineas L. King & Enoch Blasdel
Letters Patent

The schedule referred to in these Letters Patent and making part of the same containing a description in the words of the said Phineas L. King & Enoch Blasdel themselves of their improvement in the Fancy card used in Wool carding Machines

---

To all persons to whom these presents shall come. Be it known that We Phineas L. King of Sparta Township and Enoch Blasdel of Lawrenceburg Township in the County of Dearborn & State of Indiana have made an "improvement in the Fancy Card used in wool carding Machines" And that the following is a description of the same. The Carding Machine to which this improvement is applied is constructed in every respect like those in common use. This improvement which we claim as our invention is in the Fancy Card for cleaning the main cylinder & doffer. Instead of the usual Fancy Card (which is of short wire) the one we have invented & applied to use is made of needles or long steel pointed wire teeth properly secured in leather behind by wire or any other suitable substance. Our Fancy Card constructed of needles or long steel pointed wire teeth, not only does the business of the common Fancy Card in a superior manner, but it cleans the main cylinder & doffer without wearing the cards, like the common fancy card. This improvement can be applied to all wool carding Machines. The invention here claimed is that of making Fancy Cards (as before described) of needles or long steel pointed wire teeth made of common wire properly secured, instead of the short toothed fancy cards now in use. In testimony that the above is a full & true description of our invention we have hereunto signed our names before two witnesses and made oath to the same at the City of Washington this 12th day of Octr 1830.

Witnesses
William P. Elliot
Henry Hardy
348 [illegible]

Phineas L. King
Enoch Blasdel

E + L
[illegible]

(Patented 14 October 1830)

[illegible]